(12) United States Patent
Jain et al.

(10) Patent No.: US 6,344,986 B1
(45) Date of Patent: Feb. 5, 2002

(54) TOPOLOGY AND CONTROL METHOD FOR POWER FACTOR CORRECTION

(75) Inventors: Praveen K. Jain; Yan-Fei Liu, both of Kanata (CA)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/595,425

(22) Filed: Jun. 15, 2000

(51) Int. Cl.⁷ .......................... H02M 5/42; H02M 3/335
(52) U.S. Cl. ...................................... 363/89; 363/21.12
(58) Field of Search ........................ 363/16, 20, 21.01, 363/21.12, 21.14, 21.18, 84, 89, 95, 97, 131

(56) References Cited

U.S. PATENT DOCUMENTS

| | | | |
|---|---|---|---|
| 5,434,767 A | * | 7/1995 | Bataeseh et al. ............... 363/16 |
| 5,515,257 A | * | 5/1996 | Ishii ............................ 363/21 |
| 5,600,549 A | | 2/1997 | Cross |
| 5,734,562 A | | 3/1998 | Redl |
| 6,031,748 A | * | 2/2000 | Hong ........................... 363/89 |

OTHER PUBLICATIONS

Hewlett Packard 6th Annual Power Systems Symposium, Feb. 26–28, 1996, Palo Alto, California, "Novel Circuits for Implementing Power Factor Correction in Off–Line Power Converters", 10 pages.

* cited by examiner

Primary Examiner—Matthew Nguyen
(74) Attorney, Agent, or Firm—Coudert Brothers LLP

(57) ABSTRACT

In a power factor corrected AC-to-DC power supply system, a DC-to-DC power converter is coupled to the output of an AC-to-DC power converter in order to produce a regulated DC output signal from a rectified AC input signal. The AC-to-DC power converter and the DC-to-DC power converter each includes a switch for controlling the operation of their respective power converter. The AC-to-DC converter includes an inductor. The system provides power factor correction for minimizing harmonic distortion by including a controller that receives the regulated DC output voltage as a feedback signal, and in response, produces a series of drive pulses having predetermined constant duty cycle. These pulses are simultaneously fed to each switch, to operate the respective converters alternately between ON and OFF states. When the AC-to-DC converter is driven by a fixed duty cycle of the series of pulses, power factor correction is improved since the current flowing through the inductor is substantially proportional to the waveform of the rectified AC input signal. By preselecting the value of the inductor, the AC-to-DC converter is operable in a discontinuous mode when the instantaneous rectified AC input signal is low and in a continuous mode when the instantaneous rectified AC input signal is high.

22 Claims, 2 Drawing Sheets

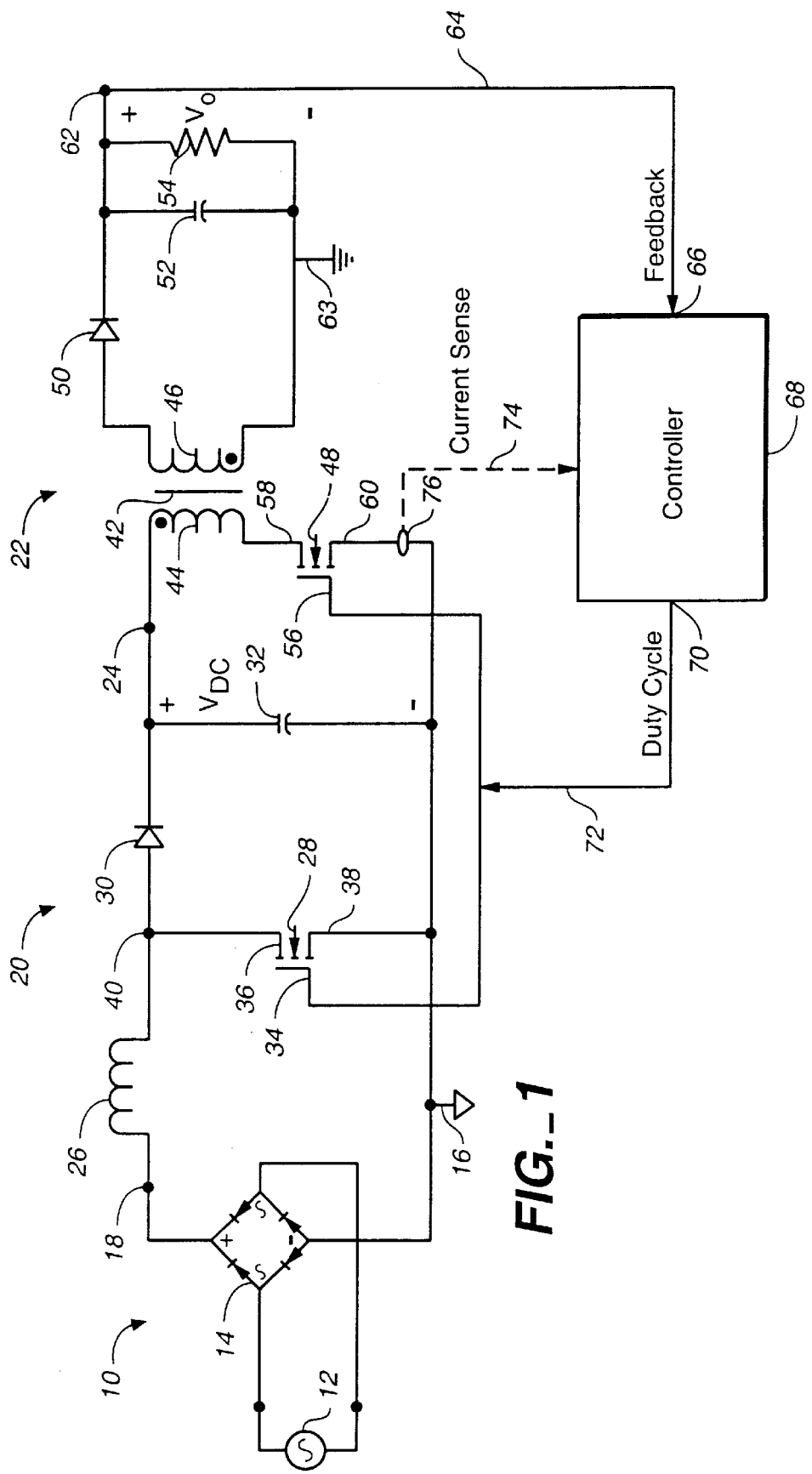
FIG._1

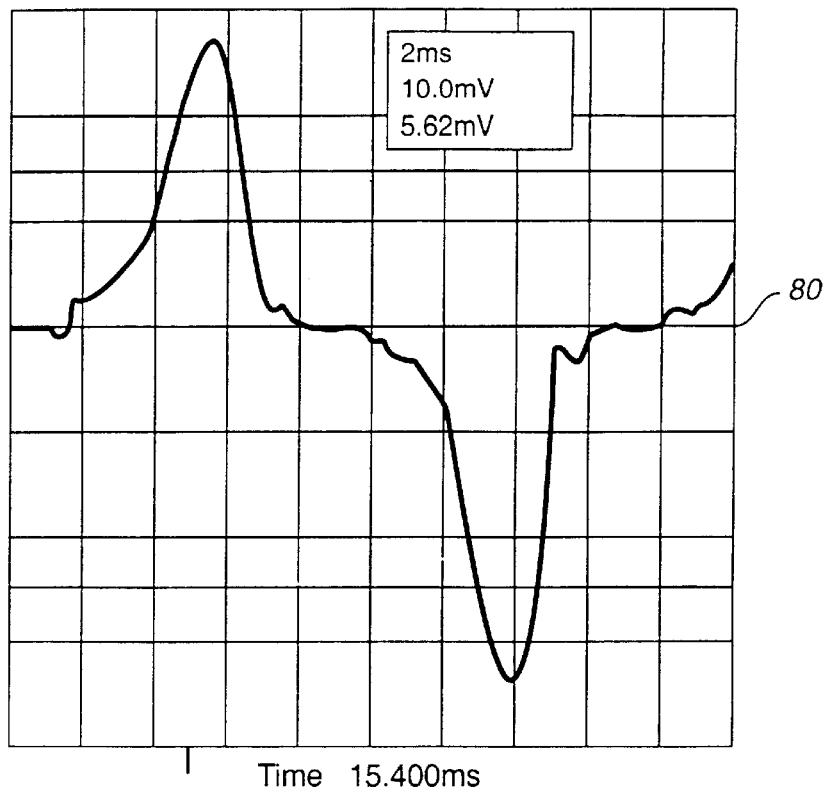
FIG._2
| Harmonic Component | 1st | 3rd | 5th | 7th | 9th | 11th | 13th |
|---|---|---|---|---|---|---|---|
| Input Current (amps) | 0.9317 | 0.358 | 0.132 | 0.080 | 0.055 | 0.050 | 0.038 |
| Current (amps) IEC-1000-3-2 | No Limit | 0.686 | 0.383 | 0.202 | 0.101 | 0.071 | 0.060 |
FIG._3
|  | New Circuit based on This Invention | Non PFC Circuit | Two Stage PFC Circuit |
|---|---|---|---|
| Power Factor | 91.9% | 70% | 99% |
| EMI | -39.6dbm(max) | -48dbm(max) | -31.8dbm(max) |
| Efficiency | 77.5% | 78.5% | 72.7% |
FIG._4

US 6,344,986 B1

TOPOLOGY AND CONTROL METHOD FOR POWER FACTOR CORRECTION

BACKGROUND OF THE INVENTION

1. Field of the Invention

The present invention relates to switching power supplies, and more particularly, to an AC-to-DC power factor correcting power converter comprising a boost power converter coupled to a DC-to-DC power converter where both converters are driven by the same signal derived from the output voltage of the power converter.

2. Description of the Prior Art

Many electronic devices, such as computers and many household appliances, require one or more regulated DC voltages. The power for such electronic devices is ordinarily supplied by power converters that convert an AC line voltage into the regulated DC voltages required by the devices.

Electrical power converters commonly include a rectifier circuit which converts the AC line voltage to an unregulated DC voltage, also known as a rectified line voltage, and a DC-to-DC converter for converting this unregulated DC voltage into one or more regulated DC output voltages. If a simple rectifier circuit is used, such power converters commonly draw high currents near the peak of the AC voltage cycle, and substantially zero current around the zero-crossing points of the voltage cycle. Thus, the input current drawn by the converter has a highly non-sinusoidal waveform with correspondingly high harmonic content.

As is known in the electrical power art, current harmonics above the fundamental frequency of the voltage do not contribute to the power drawn from a typical AC voltage source, with the result that the actual or true power drawn by the power supply is lower than the apparent power drawn. The distinction between apparent power and true power is important because power supplies are rated according to the apparent power drawn rather than the true power drawn. As a basis of comparison, the true power and apparent power drawn by a device are divided to form a ratio called the "power factor." Power factors less than about 80 percent can pose barriers to the performance or improvement of many types of electronic devices that operate on direct current, including such devices as personal computers, minicomputers, and appliances using microprocessors. For example, the high current peaks associated with lower power factors can cause circuit breakers on the AC line to trip, which limits system design in terms of the functional load it places on the AC line. Additionally, the harmonics associated with the high, non-sinusoidal current peaks often result in power-line distortion, noise, and electromagnetic interference (EMI). In general, improving the power factor of the device reduces the harmonic content and electromagnetic noise.

To address these problems, many power supplies include power factor correction circuitry that is designed to raise power factors and eliminate harmonic distortion. Such circuits are often referred to as power factor correction circuits (abbreviated "PFC"). Power factor correction circuits generally rectify the AC line voltage and produce an unregulated DC voltage (referred to herein as the "PFC voltage") in a manner that has a relatively high power factor within a given range of AC line voltages. A switching power converter then converts the PFC voltage into the required regulated voltages.

The International Electrotechnical Commission (IEC) has set standards specifying certain requirements for AC-to-DC power converters. Specifically, the IEC-1000-3-2 standard requires that the harmonic components of the input current be below a certain level. Accordingly, it is desirable to provide power factor correction for AC-to-DC power converters in order to achieve a low input current harmonic content in the AC supply, and, equivalently, a higher power factor.

One known embodiment for providing power factor correction involves using an AC-to-DC converter followed by a DC-to-DC converter where the former is a boost converter and the latter is a flyback converter. In order to provide power factor correction with this topology, the drive signal of the boost converter must be controlled to force the current flowing through the inductor in the boost converter to follow the sinusoidal waveform of the rectified input AC signal. However, conventional control techniques used to achieve this result suffer from a number of drawbacks. The predominant drawback is that a complex control circuit is needed, as well as bulky and heavy filter components to filter ripple current and to meet the EMI specification of the power supply. The result is a high cost control circuitry and the need to use more printed circuit board (PCB) space, which in turn contributes to higher fabrication costs. The overall size of the AC-DC converter is also increased.

A conventional boost converter generally comprises an inductor which is coupled between a source of AC power (e.g., a rectifier producing an unregulated AC voltage) and a switch. The switch is preferably a MOSFET transistor, which is in turn coupled in parallel with a series combination of a rectifier and an output filter capacitor across which the load is connected. The output capacitor is selected to be large in order to ensure that the load receives a substantially constant DC voltage. This constant DC signal appears across the load and is greater than the peak sinusoidal value of the input AC voltage.

One well known control method for providing power factor correction in a boost converter is to set the duration of the ON state (e.g., a time $T_{on}$ out of a period T) of the FET switch to a constant value. The constant duration of $T_{on}$ is predetermined by certain operating conditions, such as the input voltage, output voltage and output current of the boost converter. Energy is stored in the boost converter's inductor during this time $T_{on}$. Additionally, certain circuit parameters, such as the value of the boost inductor, affects the duration of $T_{on}$. When the FET switch is switched to its OFF state for a certain time period (e.g., $T_{off}$), the polarity across the inductor reverses so that the energy that was stored in the inductor during $T_{on}$ is transferred via the diode to the output capacitor. A constant DC voltage, $V_{DC}$, appears across the capacitor and has the following relationship with respect to the rectified input AC voltage:

$$V_{DC} = \frac{V_{in}}{1 - T_{on}/T} \tag{1}$$

While this control method ensures that the boost converter operates at the boundary of continuous and discontinuous modes of operation, it suffers from three drawbacks. First, because the duration of $T_{on}$ is fixed, the ripple current passing through the inductor is large. Accordingly, a bulky and heavy Electromagnetic Interference (EMI) filter is required to filter out this ripple current in order to meet the EMI specification of the power supply. Second, the switching frequency of the transistor in the boost converter must be varied in order to regulate the constant DC voltage $V_{DC}$. Such variable switching frequency control is usually undesirable for applications involving telecommunications because of possible interference. Third, because the control chip and accompanying current sensing circuit are necessary in order to provide power factor correction, the inclusion of these components occupies a significant portion of the PCB area and results in increased size and cost of the power supply.

Another well known control method for providing power factor conversion in a boost converter and for producing a constant DC voltage that is substantially free from distortion is conventionally known as the average current mode control method. With this technique, the boost converter operates in a continuous conduction mode. In particular, to obtain a high power factor, the average value of the current passing through the inductor in the boost converter is sensed and forced to follow in phase the rectified sinusoidal waveform of the input AC voltage $V_{in}$. In this control method, a multiplier is needed to generate the reference current for the boost inductor current. The average value of the boost inductor current must be sensed to achieve average current control.

A key drawback of the average current control method is the high cost of the control circuit.

What is needed is improved power factor correction in a power converter whereby the boost and DC-DC converters are driven with a control method that overcomes the above described drawbacks.

SUMMARY OF THE INVENTION

The present invention is directed to a power supply system having power factor correction. The system includes an input rectifier for generating a rectified input AC voltage from an AC power source for two stages of power conversion. The first stage is a boost converter. It is coupled to the input rectifier and converts the rectified input AC voltage into a substantially constant first DC voltage. The boost converter includes a first switch. The second stage converter is a DC-to-DC converter and is coupled to the output of said boost converter. The second converter converts the first DC voltage to a second voltage, the output voltage of the power supply system. The second converter regulates the output voltage to a desired level. The second converter includes a second switch. The power supply system also includes a controller for providing feedback control as a function of the output voltage, said controller generating a drive signal for said first and second switches so as to cause said switches to be switched on and off simultaneously.

Accordingly, it is an object of the present invention to provide a power supply system for providing power factor correction in a cost efficient manner. Cost efficiency of power factor conversion is achieved because the present invention does not require current sensing circuitry to sense the boost converter's inductor current, nor the corresponding additional control circuitry for the boost converter as required in the prior art. PCB space is also reduced.

It is another object of the present invention to reduce EMI by fixing the switching frequency of the controller's drive signal at a constant value. By maintaining a constant frequency, the low frequency ripple component appearing at the output voltage is substantially reduced. This is essential for power supplies used with applications involving telecommunications where the level of C-message noise must be very low. Additionally, the current ripple of the boost inductor is small with the present invention. This is advantageous because less EMI filtering is required to meet the above-mentioned IEC standard.

Because only one feedback control loop is required in the present invention to operate the switches within the power converters of the power supply system, the circuitry is simplified. Moreover, the response of the power supply system output voltage is fast because the feedback loop can be selected to have a wide bandwidth.

Additionally, because a regulated output voltage may be obtained for a universal input voltage range (e.g., $86V_{RMS}$ to $265V_{RMS}$), an auto range circuit is not required.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a circuit diagram of a preferred embodiment of a power supply system according to the present invention that includes power factor correction.

FIG. 2 is a graphical representation of the input current waveform as a function of time for the DC-to-DC converter used in the present invention depicted in FIG. 1.

FIG. 3 is a table listing measured harmonic components of the input current of the present invention as compared to the IEC standard values.

FIG. 4 is a table comparing the power factor and efficiency obtained by the system according to the present invention as compared to a converter that does not have power factor correction and a prior art two stage converter having power factor correction.

DESCRIPTION OF A PREFERRED EMBODIMENT

The present invention recognizes that prior art AC-to-DC power supplies having power factor correction require current sensing and signal comparison circuitry in order for the current in the boost converter to be substantially proportional to the input AC voltage. A separate control circuit is required for a second DC-DC converter such as a flyback converter, that provides DC regulation for the output voltage. This results in circuit complexity. By providing a means to obtain power factor correction, yet without such additional circuitry, the AC-to-DC power supply system according to the present invention provides power conversion with power factor correction that is accomplished more cost-effectively and efficiently. This is accomplished by providing a feedback control to simultaneously drive the power switches of the boost and flyback converters. In addition, the boost converter's inductor is selected to provide inductor current that is discontinuous when the instantaneous rectified AC input voltage is low and continuous when the instantaneous rectified AC input voltage is high.

The power supply system of the present invention produces a regulated DC output voltage. FIG. 1 depicts a preferred embodiment of an AC-to-DC power supply system 10. An AC power source 12 is coupled to a rectifier 14 in power supply system 10. Power source 12 comprises a sinusoidal voltage waveform. Rectifier 14 as shown is typically a diode bridge circuit; however, one of ordinary skill in the art will appreciate that other embodiments for providing rectification of sinusoidal waveforms originating from an AC power source may be substituted. Both the power source 12 and rectifier 14 are preferably connected to a common ground 16. The rectifier 14 provides a rectified AC input voltage measured across from node 18 to ground 16. The rectified AC input voltage typically falls within an expected input voltage range (e.g., 86 $V_{RMS}$ to 256 $V_{RMS}$, where RMS refers to the root-mean-square of the input AC voltage) as is well-known in the art.

Power supply system 10 has a first stage which includes a boost converter 20 coupled to rectifier 14, and also a second stage which includes a DC-to-DC power converter 22 coupled to the output of converter 20. Power converter 20 is a conventional boost converter and DC-DC converter 22 is preferably a conventional flyback power converter.

The boost converter 20 comprises an inductor 26, a switch 28, a rectifier diode 30, and a capacitor 32. Switch 28 is preferably a MOSFET power transistor having a control node 34 (e.g., a gate) and two conduction terminals 36 and 38 (e.g., a source and a drain, respectively). One end of inductor 26 is coupled to rectifier 14 at node 18. The other end of inductor 26 is coupled to one end of diode 30 and to one conduction terminal 36 of switch 28, as indicated at node 40. Diode 30 and capacitor 32 form a series combination which is connected in parallel across the two conduction terminals 36 and 38. As already described, a feature of a boost converter is to provide power factor correction when the current flowing through the inductor 26 has substantially the same waveform as the rectified AC input voltage appearing at node 18.

DC-to-DC converter 22 functions to correct the voltage received from the boost converter 20 to a lower output regulated DC voltage, the output voltage of the power supply system 10. The preferred embodiment for converter 22 is a conventional flyback converter, as illustrated in FIG. 1. Flyback converter 22 comprises a transformer 42 having a primary winding 44 and a secondary winding 46, a switch 48, rectifier diode 50, and an output filter capacitor 52 across which a load 54 is connected. Although various switches may be used, switch 48 is preferably a MOSFET power transistor similar to switch 28. Switch 48 has a control node 56 as well as two conduction terminals 58 and 60. Primary winding 44 includes a first terminal connected to node 24 and a second terminal connected to conduction terminal 58 of switch 48. Coupled across the secondary winding 46 is the series combination of diode 50 and the parallel combination of capacitor 52 and load 54.

As is conventionally known, the operation of a flyback power converter is analogous to an energy storage converter. More specifically, the flyback power converter functions to cyclically store energy in the power transformer and to transfer such stored energy to a capacitor, to produce the desired output voltage. The level of the output voltage is regulated and controlled by varying the on time of switch 48 (and thus its duty cycle), thereby controlling the amount of energy that is stored in the transformer and transferred to the capacitor and load per cycle. Switch 48 is connected in series with the primary winding 44 of the transformer. The converter 22 operates by switching the transistor alternately to ON and OFF states. When the switch 48 is in its ON state, current flows through primary winding 44 so that magnetic energy is stored in transformer 42. When the switch 48 is in its OFF state, current flowing through the primary winding 44 is cut off, such that the voltage appearing across transformer 42 is reversed. This reversal causes forward biasing of diode 50 so that current flows out of the secondary winding 46 into capacitor 52 and out to load 54. This operation permits the stored energy in transformer 42 to be transferred out of the secondary winding 46 and stored in capacitor 52, so as to produce the desired constant output voltage to load 54. The duration of time in which this energy is released from the secondary winding to the load is known as the flyback period or cycle. As is well known, when the transistor is in the ON state, current does not flow through secondary winding 46.

In the present invention, flyback converter 22 receives the first DC voltage $V_{DC}$ from boost converter 20 across node 24 and ground 16. Flyback converter 22 converts $V_{DC}$ to output voltage $V_o$ across node 62 and output ground 63. The output voltage $V_o$ is a regulated DC voltage of lower value than $V_{DC}$ and within the desired voltage range for the particular specification of the power supply.

Regulation of the output DC voltage is accomplished in a conventional way. Preferably, feedback of the output voltage $V_o$ from node 62 is provided on signal line 64, which is coupled to an input terminal 66 of a controller 68. An output terminal 70 of controller 68 is coupled to signal line 72, which in turn is coupled to control node 56 of FET switch 48. The preferred embodiment of controller 68 is a pulse width modulation (PWM) control circuit, which produces a series of constant frequency drive pulses whose pulse widths are varied depending on whether the output DC voltage is above or below its specified value. The rates of the on-time of switch 48 to the period of each switch cycle is the duty cycle of the switch.

During operation, power supply system 10 produces a rectified input AC signal from power source 12. At the first stage of power conversion, the rectified AC signal is converted to a first DC voltage via boost converter 20. The output of boost converter 20 is a DC voltage with small ripple. This first DC voltage is then fed as an input to the second stage of power conversion, comprising flyback converter 22. The operation of flyback converter 22 has been described above. Because the first DC voltage is unregulated, the flyback converter is used to convert and to regulate the first DC voltage to the desired level. The power factor is independent of either voltage or current control techniques.

As seen in FIG. 1, the output of pulse width modulation control circuit 68 is a series of fixed frequency drive pulses that are coupled at the same time to the gates 34 and 56 of the MOSFET transistor switches 28 and 48, respectively, in boost converter 20 and flyback converter 22. As described above, the duty cycle of switch 48 is varied to control the output DC voltage level. A key advantage of the present invention is that it is unnecessary for the PWM control circuit 68 to know the required duty cycle for the series of pulses that are provided to boost switch 28 in order for the boost inductor current to approximately follow the waveshape of the input AC signal and thus provide power factor connection. It has been determined that, by causing the duty cycle of switch 28 to match the duty cycle of switch 48, there is no need to separately calculate the duty cycle for the boost switch 28. This results because power factor correction is inherent to the topology of the present invention. Although a boost and flyback topology has been shown in FIG. 1, it will be appreciated that various other AC-to-DC converter topologies (e.g., boost and forward) may be similarly used without the need to separately calculate the duty cycle for the boost switch 28.

It is noted that the value of the boost inductor 26 is preselected so that when the instantaneous value of the rectified input AC voltage is low, the inductor operates in a discontinuous mode, and when the instantaneous value of the rectified input AC voltage is high, the inductor operates in a continuous mode. In a preferred embodiment, the boost converter operates in the discontinuous mode within 0 to 45 degrees around the zero crossings of the input AC signal waveform. This effectively shapes the inductor current waveform so as to eliminate the harmonic components that introduce distortion. Moreover, because the frequency of switching of switch 28 is fixed, EMI is reduced as well as the low frequency ripple component at the system output. Experiments by the inventors indicate that typical values for a boost inductor 26 vary between 300 μH and 1000 μH, depending upon the power level used. In an exemplary example, a boost inductor 26 value of 500 μH would be used for an output voltage power of 150 W, and with a universal input voltage range of 90$V_{RMS}$ to 265$V_{RMS}$.

It is also desirable that the feedback loop comprising signal lines 64, 72 and controller 68 have a wide bandwidth, that is with a frequency much higher than the frequency of the AC input signal at node 18. The present inventors have noticed that if the bandwidth is at about one tenth to one fifth of the switching frequency for switches 28 and 48, then low frequency ripple at the output voltage may be substantially reduced. Moreover, when the feedback loop operates with a high bandwidth, the system response of the output voltage is increased. By capturing and returning the output voltage to drive both power converters 20 and 22, the present invention is cost-effective because it eliminates the need for separate control circuits for each converter.

Furthermore, if current mode control is used in DC-to-DC converter 22, the current through the switch 48 in the flyback converter may also be sensed through the dotted line representing a current sense line 74. With this embodiment, a sensor 76 would be placed at conduction terminal 60.

Operated in manner described above, the present invention permits improved power factor correction, as compared with the prior art, because the inductor current in the boost converter will be substantially proportional to the sinusoidal waveform of the input AC voltage when the boost converter is driven by a fixed duty cycle. This provides improved power factor correction. Moreover, because the gate drive signal for the boost converter is the same as that for the flyback converter, the output voltage of the power supply system may be regulated without the additional circuits and components of the prior art. Consequently, the present invention provides power factor correction at a lower cost than with conventional techniques. As compared with conventional AC-to-DC power supplies lacking power factor correction, the topology and control method according to the present invention shapes the input current of the boost converter in a manner that conforms to the regulatory requirement for the reduction of harmonic current components. Additionally, the present invention provides a well-regulated DC output voltage from the input AC voltage without using auto-range circuitry.

Referring to FIG. 2, an input current waveform for the inductor in the AC-to-DC converter is shown to be substantially sinusoidal and thus proportional to the input AC voltage. It is noted that only at or near the zero voltage axis 80, does some amount of distortion occur. However, this amount of distortion is negligible and will not create a level of harmonic distortion that the IEC-1000-3-2 standard intends to preclude. Rather, with the present invention, an output voltage $V_o$ of 5 volts (at 5 amperes) and of 19 volts (at 3 amperes) is easily obtained. The present invention provides measured harmonic components of the input current using the power system 10 that are well below the IEC standard values for such current harmonic components, as illustrated in FIG. 3. Accordingly, the present invention is well-suited for AC-to-DC power supplies having a power level of up to 150 Watts.

As seen in the table provided in FIG. 4, the AC-to-DC power supply system of the present invention performs with power factor of 91.9% having an EMI of −39.6 dbm$_{max}$ and an efficiency of 77.5%. This result is considerably better than conventional converters lacking power factor correction which have a power factor of 70%, EMI of −48 dbm$_{max}$, and efficiency of 78.5%. By contrast, conventional two-stage converters with power factor correction have a power factor of 99%, but with a tradeoff being an EMI of −31.8 dbm$_{max}$ and 72.7% efficiency.

It will be appreciated that embodiments other than as described above may be utilized and structural or logical changes may be implemented without departing from the scope of the present invention. Consequently, the detailed description is not to be construed in a limiting sense, and the scope of the present invention is defined by the appended claims and their equivalents.

What is claimed is:

1. An AC-to-DC power supply system having power factor correction, comprising:
   an input rectifier for generating a rectified input voltage for said system from a source of AC power;
   a boost converter coupled to said rectifier for converting said input voltage to a first DC voltage, said boost converter having a first switch;
   a DC-DC converter coupled to the output of said boost converter for converting said first DC voltage to a second DC output voltage, said DC-DC converter having a second switch; and
   a controller for providing feedback control as a function of said output voltage, said controller generating a single drive signal that is coupled to both said first and said second switches so as to cause said switches to be switched on and off simultaneously.

2. The system of claim 1, wherein said rectifier is a diode bridge.

3. The system of claim 1, wherein said DC-to-DC converter is a flyback converter.

4. The system of claim 1, wherein said controller is a pulse width modulation circuit
   having an input for receiving said output voltage, and
   having an output for providing a series of drive pulses with a predetermined fixed duty cycle for selectively switching both said first switch and the second switch to alternating ON and OFF states at the same time.

5. The system of claim 1, wherein said boost converter further includes an inductor coupled between said rectifier and said first switch, and
   a first series combination of a diode and capacitor connected in parallel with said first switch, said inductor having a selected value to provide current flow through the inductor that is discontinuous when the instantaneous rectified AC input voltage is low and continuous when the instantaneous rectified AC input voltage is high.

6. The system of claim 5, wherein said first switch includes a control node coupled to the output, said drive signal being applied to the control node so that said first switch is operable to permit current flow through said inductor.

7. The system of claim 6, wherein said first switch is a MOSFET device.

8. The system of claim 3, wherein said first DC voltage has a value greater than a peak sinusoidal value of said AC voltage, and said output voltage is a regulated DC voltage having value less than said constant voltage.

9. The system of claim 8, wherein said rectified input voltage is not less than 86 volts$_{RMS}$ and not more than 265 volts$_{RMS}$.

10. The system of claim 9, wherein said output voltage is not less than 5 volts$_{DC}$ and not more than 19 volts$_{DC}$.

11. The system of claim 1,
wherein said second switch includes first and second conduction terminals, and
wherein said DC-DC converter further includes
a transformer having a primary winding and a secondary winding, wherein a first terminal of said primary winding is coupled to the diode and a second terminal of said primary winding is coupled to the first conduction terminal so that when said second switch is in the ON state, current flows through the primary winding and energy is stored in the transformer, and
a second series combination of a conducting element and a parallel combination of a resistor and capacitor, said second series combination coupled in parallel with said secondary winding, so that when said second switch is in the OFF state, said energy is transferred to the parallel combination to produce said output voltage.

12. The system of claim 11, wherein said second switch further includes a control node, said drive signal being applied to the control node so that said second switch is operable to permit current flow through said primary winding and to cause energy to be periodically stored in said transformer.

13. The system of claim 12, wherein said second switch is a MOSFET device and said conducting element is a diode.

14. The system of claim 13, wherein said DC-DC converter further includes means for sensing said current flow, said sensor being coupled between one of said conduction terminals and said controller.

15. The system of claim 1, wherein said feedback control is provided for a corresponding bandwidth of no less than one tenth and no more than one fifth of the switching frequency of said drive signal.

16. An AC-to-DC power supply system having power factor correction, comprising:
rectification means for providing a rectified input AC voltage from an AC power source;
first means for converting said rectified input AC voltage to a first DC voltage, said first means coupled in parallel to said rectification means and including a first switch;
second means for converting said first DC voltage to an output DC voltage, said second means regulating said output DC voltage and including a second switch; and,
control means for providing a single drive signal comprising a series of drive pulses of a predetermined constant duty cycle derived from said output voltage, said single drive signal being applied simultaneously to operate said first switch and said second switch so as to provide said power factor correction.

17. The system of claim 16, wherein
said rectification means is a diode bridge,
said first means is a boost power converter,
said second means is a flyback power converter, and
said control means is a pulse width modulation circuit having an input for receiving said output DC voltage, and having an output for providing said series of drive pulses having a predetermined constant duty cycle for selectively switching said first switch and said second switch simultaneously to alternating ON and OFF states.

18. The system of claim 17, wherein
said system produces an output power up to 150 watts,
said rectified input AC voltage is not less than 86 volts$_{RMS}$ and not more than 265 volts$_{RMS}$,
said first DC voltage has a value greater than a peak sinusoidal value of said AC voltage, and
said output DC voltage is a regulated DC voltage having a value less than said first voltage.

19. The system of claim 18, wherein said output DC voltage is not less than 5 volts$_{DC}$ and not more than 19 volts$_{DC}$.

20. The system of claim 17, wherein said boost power converter includes:
an inductor coupled between said diode bridge and said first switch,
a first series combination of a diode and capacitor connected in parallel with said first switch,
said first switch including a control node, said drive pulses being applied to the control node so that said first switch is operable to permit current flow through said inductor, and wherein said current flow through the inductor is discontinuous when the instantaneous rectified input AC voltage is low and continuous when the instantaneous rectified input AC voltage is high.

21. A method of supplying a DC output voltage from an AC power source, comprising the steps of:
rectifying the AC voltage from said power source to produce a rectified AC input voltage for a power supply;
converting said rectified AC input voltage to a first DC voltage by means of an AC-to-DC converter having a first switch;
converting said first DC voltage to an output voltage by means of a DC-to-DC converter having a second switch;
coupling said output voltage to a controller;
generating a single drive signal comprising drive pulses as a function of the difference between the output voltage and a reference voltage, said drive pulses having a predetermined constant duty cycle; and
coupling said single drive signal to both said first and said second switches; and
simultaneously switching said first switch and said second switch between alternating ON and OFF states as a function of said drive pulses of said single drive signal.

22. The method of claim 21, further comprising the steps of:
generating discontinuous inductor current in said AC-to-DC converter when said rectified AC input is low, and
generating continuous inductor current in said AC-to-DC converter when said rectified AC input is high.

* * * * *